(12) United States Patent
Martin et al.

(10) Patent No.: US 9,187,087 B2
(45) Date of Patent: Nov. 17, 2015

(54) CONTROL OF POWERSPLIT TRANSMISSION FOR AN ELECTRIC VEHICLE

(71) Applicant: FORD GLOBAL TECHNOLOGIES, LLC, Dearborn, MI (US)

(72) Inventors: Douglas R. Martin, Canton, MI (US); Walter J. Ortmann, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 71 days.

(21) Appl. No.: 13/848,119

(22) Filed: Mar. 21, 2013

(65) Prior Publication Data

US 2013/0217538 A1 Aug. 22, 2013

Related U.S. Application Data

(63) Continuation-in-part of application No. 13/198,062, filed on Aug. 4, 2011, now Pat. No. 8,740,739.

(51) Int. Cl.
| | |
|---|---|
| *B60K 6/387* | (2007.10) |
| *B60K 6/365* | (2007.10) |
| *B60W 20/00* | (2006.01) |
| *B60K 6/442* | (2007.10) |
| *B60K 6/445* | (2007.10) |
| *B60K 6/48* | (2007.10) |

(52) U.S. Cl.
CPC ............ *B60W 20/40* (2013.01); *B60K 6/387* (2013.01); *B60K 6/442* (2013.01); *B60K 6/445* (2013.01); *B60W 20/10* (2013.01); *B60K 6/365* (2013.01); *B60K 2006/4841* (2013.01); *F16H 2200/2035* (2013.01); *F16H 2200/2041* (2013.01); *Y02T 10/6234* (2013.01); *Y02T 10/6239* (2013.01); *Y10S 903/902* (2013.01); *Y10T 477/26* (2015.01)

(58) Field of Classification Search
CPC combination set(s) only.
See application file for complete search history.

(56) References Cited

U.S. PATENT DOCUMENTS

| | | | |
|---|---|---|---|
| 5,887,670 A | 3/1999 | Tabata et al. | |
| 6,155,364 A | 12/2000 | Nagano et al. | |
| 8,371,975 B2 | 2/2013 | Seo et al. | |
| 2004/0058769 A1* | 3/2004 | Larkin | 475/5 |
| 2005/0109549 A1* | 5/2005 | Morrow | 180/65.2 |
| 2006/0046886 A1* | 3/2006 | Holmes et al. | 475/5 |
| 2009/0221390 A1* | 9/2009 | Houle | 475/5 |
| 2010/0099532 A1* | 4/2010 | Cashen | 475/5 |
| 2010/0137091 A1 | 6/2010 | Park et al. | |
| 2012/0065017 A1 | 3/2012 | Yamada | |
| 2013/0012347 A1* | 1/2013 | Ortmann et al. | 475/5 |

* cited by examiner

*Primary Examiner* — Ramya Burgess
*Assistant Examiner* — Mark Manley
(74) *Attorney, Agent, or Firm* — David B. Kelley; MacMillan, Sobanski & Todd, LLC

(57) ABSTRACT

A method for controlling a powersplit transmission includes connecting an engine to the transmission, provided an engine torque request is present; connecting a motor to the transmission, provided an engine torque request is absent and the engine is on; and disconnecting the engine and motor from the transmission, provided the engine is off, and using a traction motor to produce wheel torque.

10 Claims, 5 Drawing Sheets

CONTROL OF POWERSPLIT TRANSMISSION FOR AN ELECTRIC VEHICLE

This is a continuation-in-part application of pending U.S. application Ser. No. 13/198,062, filed Aug. 4, 2011.

BACKGROUND OF THE INVENTION

1. Field of the Invention

This invention relates generally to a powersplit powertrain for an electric vehicle, and particularly to operational control of a planetary gearset.

2. Description of the Prior Art

Fuel economy is critical in a hybrid electric vehicle (HEV). Spinning the planetary gears at all times consumes energy due to friction losses, which negatively affects fuel economy.

The powertrain of a HEV includes an engine, electric motor/generator and traction battery, wherein the engine and motor can drive the wheels individually, the engine can charge the traction battery through the electric machine operating as a generator, and vehicle kinetic energy can be recovered and regenerated using the wheel brakes to drive the generator and recharge the battery.

In the powertrain for a plug-in hybrid (PHEV), the traction battery is significantly increased in capacity so that electrical energy from the electric grid can be used to drive the vehicle. As a result, a much greater use of electric drive is expected. The direct connection of the generator to the wheel speed causes the generator shaft to rotate as the vehicle moves when the engine is off. This causes several issues including (i) as the vehicle increases in speed, the generator speed gets excessively high causing a durability concern for the bearing, planetary gearset and generator; (ii) lowering of available torque needed to start the engine; (iii) since the generator is not being used, it generates an unnecessary spin loss; and (iv) in reverse gear with the engine running, the motor must react, thereby reducing the torque provided to the wheels.

SUMMARY OF THE INVENTION

A method for controlling a powersplit transmission includes connecting an engine to the transmission, provided an engine torque request is present; connecting a motor to the transmission, provided an engine torque request is absent and the engine is on; and disconnecting the engine and motor from the transmission, provided the engine is off, and using a traction motor to produce wheel torque.

Conventional powersplit driveline spin the planetary gear set whenever the vehicle is moving or the engine is spinning. The control method configures hardware into a series hybrid configuration, but does not operate. The generator and engine do not turn until reconfigured into a Powersplit operating mode. Wheel torque and regeneration is handled by the traction motor during this operation.

The control method disconnects the the planetary gear set to avoid losses and improve fuel economy, which is especially helpful when tip-out "sailing" is maximized.

The powertrain provides full torque to the wheels from the traction motor, a benefit over a single mode powersplit powertrain.

The powertrain provides the high fuel economy and driveability of a powersplit powertrain with improved towing and vehicle launch capability.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figures 1, 2:
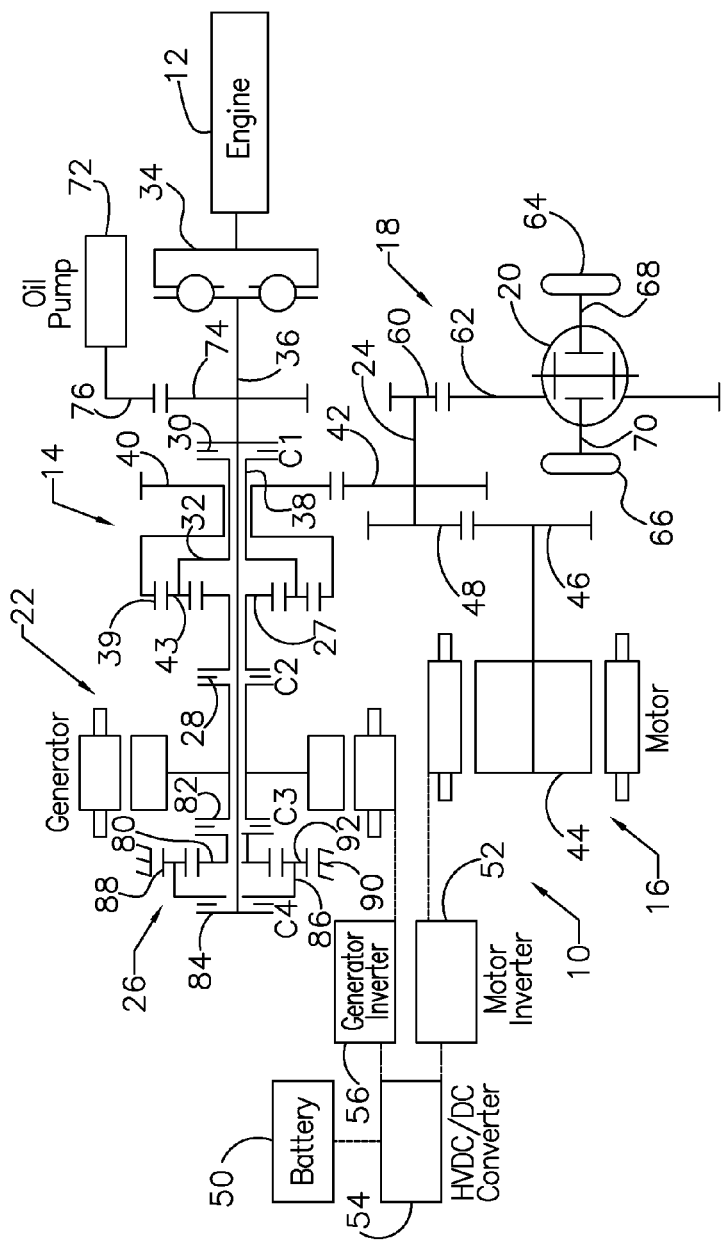
FIG. 1 is a schematic diagram of a HEV powertrain.
FIG. 2 is a chart showing the engaged and disengaged state of clutches that control the powertrain of FIG. 1.

Referring first to FIG. 1, a powertrain 10 includes a power source such as an internal combustion engine 12, such as a diesel engine or gasoline engine; a first planetary gearset 14; an electric motor 16; layshaft gearing 18; a differential mechanism 20; an electric generator 22; a countershaft 24, which is driveably connected to differential mechanism 20, output pinion 40 and motor 16; and a second planetary gearset 26. Each electric machine 16, 22 is a motor-generator, although conventionally electric machine 16 is referred to as a motor or traction motor, and electric machine 22 is referred to as a generator.

The sun gear 27 of the planetary gearset 14 is connected by clutch 28 to the generator 22. The carrier 32 of the planetary gearset 14 is connected by clutch 30 to the engine 12 through a torsion damper 34 and shaft 36. The ring gear 39 of gearset 14 is driveably connected to countershaft 24 by engaged output pinion 40 and gear 42, which form a layshaft gear pair 40-42. Planet pinions 43, supported on carrier 32, are in continual meshing engagement with ring gear 39 and sun gear 27.

The rotor 44 of motor 16 is connected to countershaft 24 through the gear pair 46-48.

Motor 16 is electrically connected to a traction battery 50 through an inverter 52 and a high voltage DC/DC converter 54. Similarly, generator 22 is electrically connected to battery 50 through an inverter 56 and converter 54.

Countershaft 24 is connected through a pinion 60 and ring gear 62 of the differential mechanism 20, which transmits power to the vehicle wheels 64, 66, through halfshafts or axle shafts 68, 70.

An oil pump 72 is driveably connected to shaft 36 and the engine output by a pinion 74 and gear 76.

The sun gear 80 of planetary gearset 26 is connected by clutch 82 to the generator 22. The carrier 86 of the planetary gearset 26 is connected by clutch 84 to the engine 12 through a torsion damper 34 and shaft 36. The ring gear 88 of gearset 26 is fixed against rotation due to its connection to case 90. Planet pinions 92, supported on carrier 86, are in continual meshing engagement with ring gear 88 and sun gear 80.

Powertrain 10 operates in powersplit mode when clutches 28, 30 are engaged and clutches 82, 84 are disengaged. Engine 12 is connected through clutch 30 to carrier 32, and the rotor of generator 22 is connected through clutch 28 to sun gear 27. In powersplit operation power produced by engine 12 and, if the battery 50 is supplying electric energy to generator, power produced by generator 26 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20, which transmits power differentially to the vehicle wheels 64, 66, through shafts 68, 70. In powersplit operation with generator 22 operating as an electric generator, engine 12 supplies power to generator 22, thereby allowing the battery 50 to be recharged.

Powertrain 10 operates in series mode when clutches 28, 30 are disengaged and clutches 82, 84 engaged. Engine 12 is connected through clutch 84 to carrier 86 of gearset 26, sun gear 80 is overdriven relative to the speed of engine 12, and clutch 82 connects overdriven sun gear 80 to the rotor of generator 22. In series operation power produced by engine 12 drives generator 26 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Figures 3, 4:
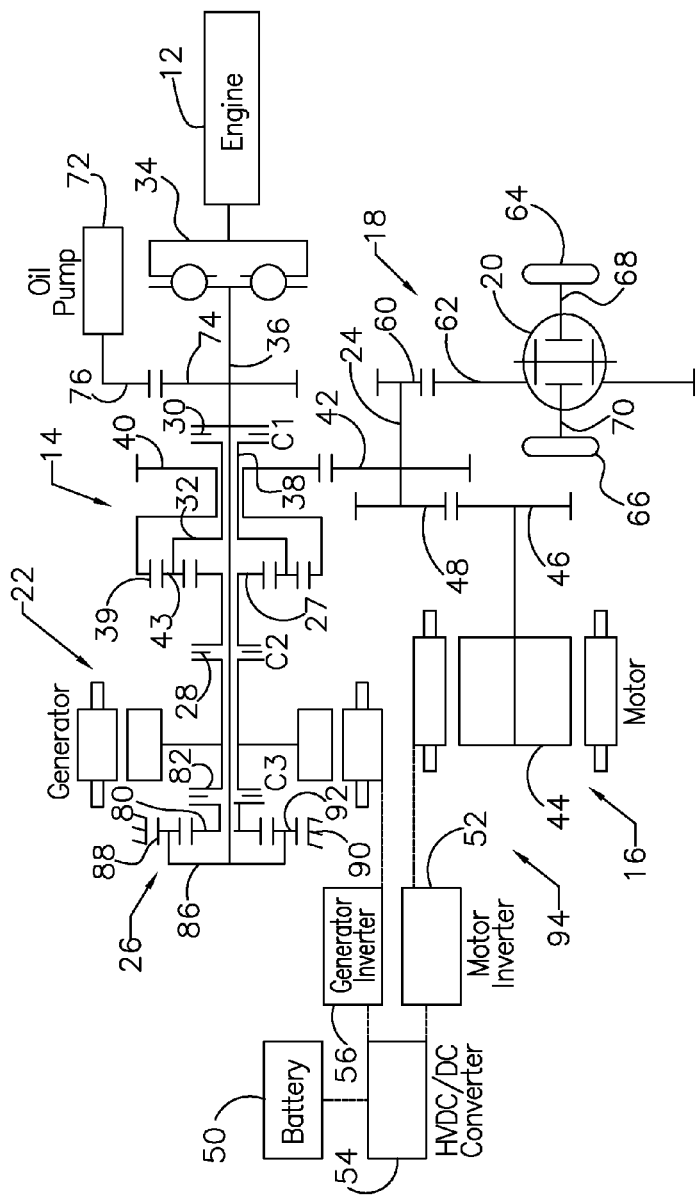
FIG. 3 is a schematic diagram of a HEV powertrain.
FIG. 4 is a chart showing the engaged and disengaged state of clutches that control the powertrain of FIG. 3.

In FIG. 3, clutch 84 is deleted, thereby directly, continually connecting carrier 86 of gearset 26 to engine 12 through shaft 36 and torsion damper 34. The powertrain 94 of FIG. 3 operates in powersplit mode when clutches 28, 30 are engaged and clutch 82 is disengaged. Engine 12 is connected through clutch 30 to carrier 32, and the rotor of generator 22 is connected through clutch 28 to sun gear 27. In powersplit operation, power produced by engine 12 and generator 26 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20. In powersplit operation with generator 22 operating as an electric generator, engine 12 supplies power to generator 22, thereby allowing the battery 50 to be recharged.

The powertrain 94 of FIG. 3 operates in series mode when clutches 28, 30 are disengaged and clutch 82 is engaged. Engine 12 is connected directly to carrier 86 of gearset 26, sun gear 80 and the rotor of generator are overdriven relative to the speed of engine 12, and clutch 82 connects overdriven sun gear 80 to the rotor of generator 22. In series operation, power produced by engine 12 drives generator 26 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Figures 5, 6:
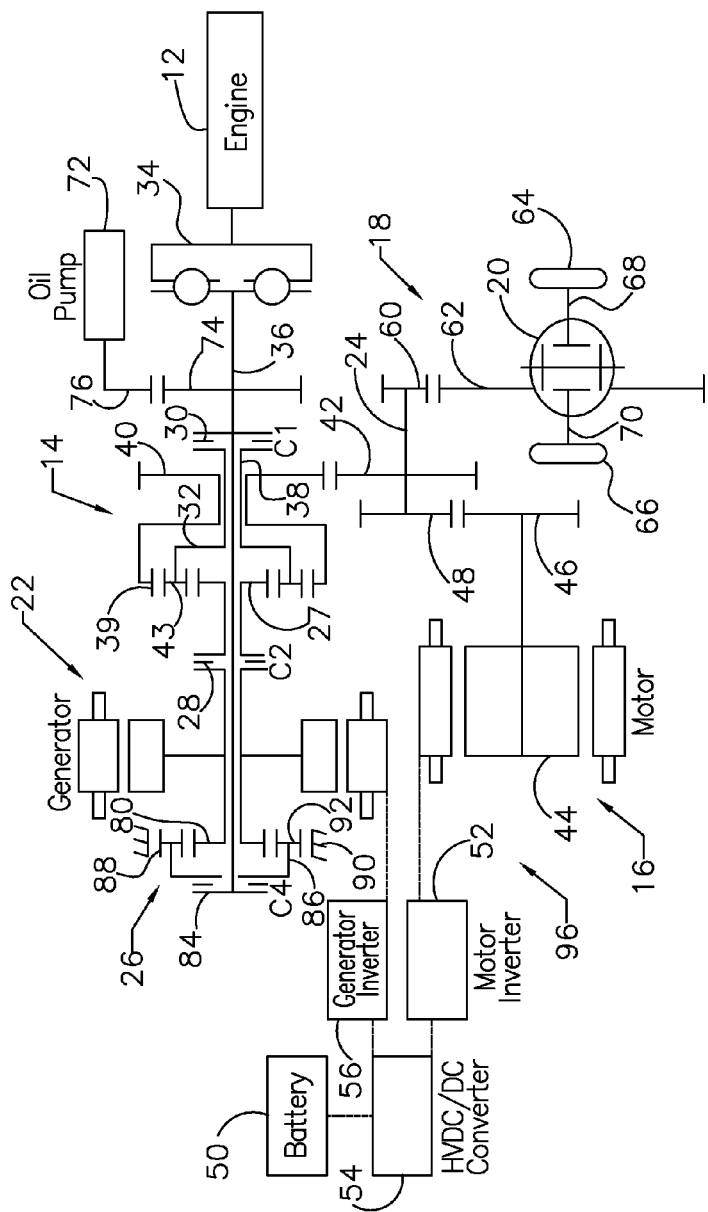
FIG. 5 is a schematic diagram of a HEV powertrain.
FIG. 6 is a chart showing the engaged and disengaged state of clutches that control the powertrain of FIG. 5.

In FIG. 5, clutch 84 is present, but clutch 82 is deleted, thereby directly, continually connecting sun gear 80 of gearset 26 to the rotor of generator 22. The powertrain 96 of FIG. 5 operates in powersplit mode when clutches 28, 30 are engaged and clutch 84 is disengaged. Engine 12 is connected through clutch 30 to carrier 32, and the rotor of generator 22 is connected through clutch 28 to sun gear 27. In powersplit operation, power produced by engine 12 and generator 26 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20. In powersplit operation with generator 22 operating as an electric generator, engine 12 supplies power to generator 22, thereby allowing the battery 50 to be recharged.

The powertrain 96 of FIG. 5 operates in series mode when clutches 28, 30 are disengaged and clutch 84 is engaged. Engine 12 is connected through clutch 84 to carrier 86 of gearset 26, sun gear 80 is overdriven relative to the speed of engine 12 and connected directly to the rotor of generator 22. In series operation, power produced by engine 12 drives generator 22 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Figures 7, 8:
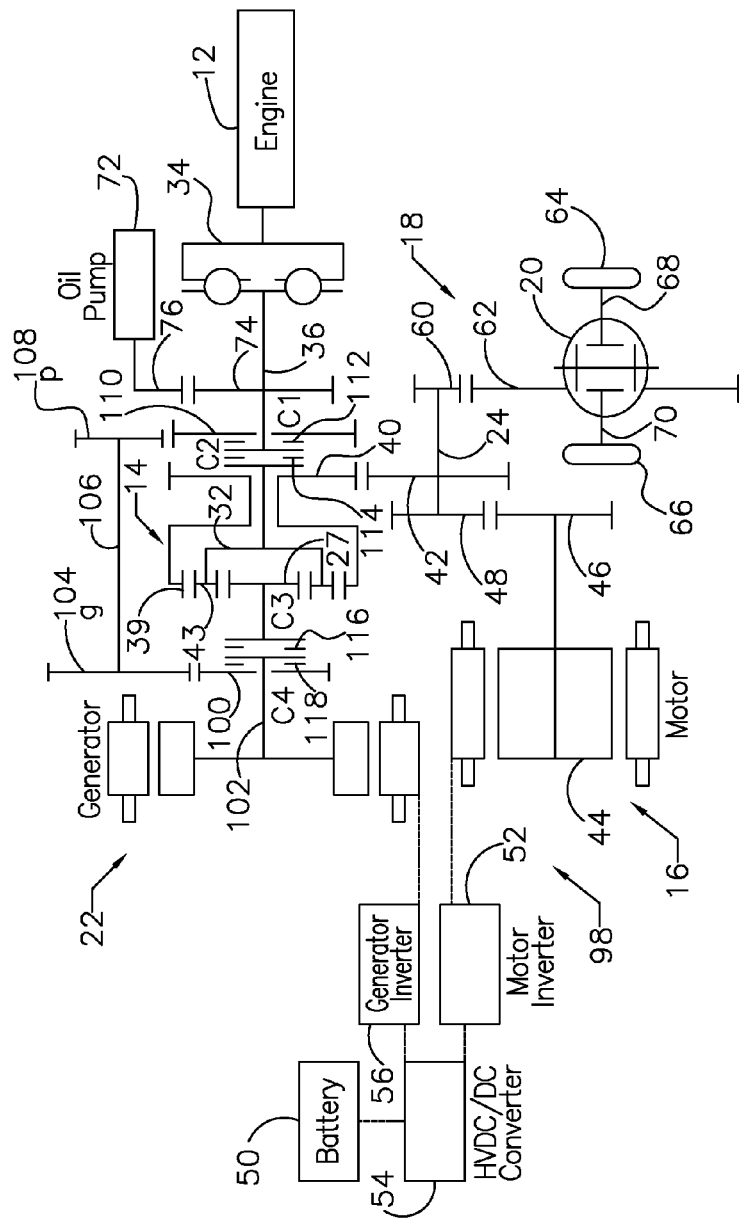
FIG. 7 is a schematic diagram of a HEV powertrain.
FIG. 8 is a chart showing the engaged and disengaged state of clutches that control the powertrain of FIG. 7.

Powertrain 98 of FIG. 7 includes a shaft 102, connected to the rotor of generator 22; a pinion 100, gear 104 meshing with pinion 102; a second countershaft 106 secure to gear 104 and to a pinion 108; a gear 110, meshing with pinion 108; a clutch 112 for opening and closing a drive connection between shaft 36 and gear 110; a clutch 114 for opening and closing a drive connection between shaft 36 and carrier 32 of gearset 14; a clutch 116 for opening and closing a drive connection between sun gear 27 and shaft 102; and a clutch 118 for opening and closing a drive connection between shaft 102 and pinion 100.

Powertrain 98 operates in powersplit mode when clutches 114, 116 are engaged and clutches 112, 118 are disengaged. Engine 12 is connected through clutch 112 to carrier 32, and the rotor of generator 22 is connected through clutch 116 to sun gear 27. In powersplit operation, power produced by engine 12 and, if the battery 50 is supplying electric energy to generator, power produced by generator 26 is transmitted through gearset 14 and gear pair 40-42 to countershaft 24, and power produced by motor 16 is transmitted by gear pair 46-48 to countershaft 24. Final drive gear pair 60-62 transmits the power from engine 12, motor 16 and generator 22 to differential mechanism 20, which transmits power differentially to the vehicle wheels 64, 66, through shafts 68, 70. In powersplit operation with generator 22 operating as an electric generator, engine 12 supplies power to generator 22, thereby allowing the battery 50 to be recharged.

Powertrain 98 operates in series mode when clutches 112, 118 are engaged and clutches 114, 116 are disengaged. Engine 12 is connected through clutch 112, gear 110, pinion 108, countershaft 106, gear 104, pinion 100 and shaft 102 to the rotor of generator 22, which is overdriven relative to the speed of engine 12. In series operation, power produced by engine 12 drives generator 26 at a relatively high speed, thereby recharging battery 50, and power produced by motor 16 is transmitted by gear pair 46-48 to countershaft 24. Final drive gear pair 60-62 transmits the power produced by motor 16 to differential mechanism 20.

Figure 9:
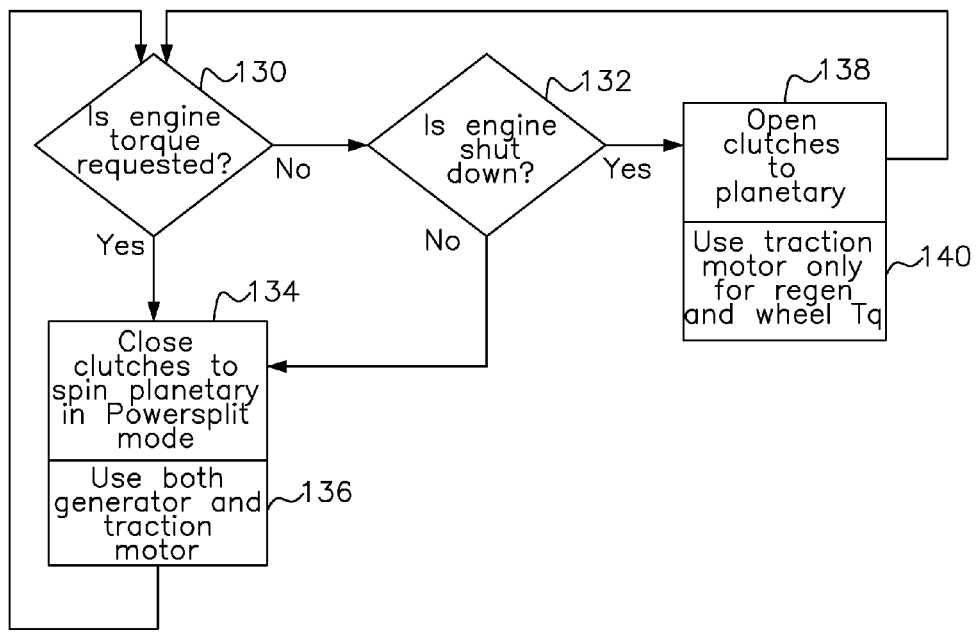
FIG. 9 is a logic flow diagram of a control algorithm.

FIG. 9 is a logic flow diagram representing a control algorithm for disengaging planetary gear set 14, which disengagement avoids losses and improves fuel economy. At step 130 a test is performed to determine whether torque from engine 12 is requested. If the result of test 130 is logically negative, at step 132 a test is performed to determine whether engine 12 is shut off.

If the result of test 130 is logically positive and the result of test 132 is negative, at step 134 C2 clutch 114 and C3 clutch 116 are closed, thereby spinning the planetary gear set 14 in the Powersplit mode, such that sun gear 27 is connected through C3 clutch 116 to generator 22 and pinion carrier 32 is connected through C2 clutch 114 to engine 12.

At step 136, generator 22 and traction motor 16 are used with engine 12 to transmit torque to the driven wheels 64, 66. Thereafter, control returns to step 130.

If the result of test 132 is positive, indicating that engine torque is not requested and engine 12 is shut off, at step 138 C2 clutch 114 and C3 clutch 116 are opened, thereby disconnecting sun gear 27 from generator 22 through C3 clutch 116 and disconnecting pinion carrier 32 from engine 12 through C2 clutch 114. Thereafter, control returns to step 130.

At step 140, only traction motor 16 is used to transmit torque to the driven wheels 64, 66 and for energy regeneration.

In accordance with the provisions of the patent statutes, the preferred embodiment has been described. However, it should be noted that the alternate embodiments can be practiced otherwise than as specifically illustrated and described.

The invention claimed is:

1. A method for controlling a powersplit transmission, comprising:
   (a) engaging a first clutch connecting an engine to a first member of a planetary gear set of the transmission, provided an engine torque request is present;
   (b) engaging a second clutch connecting a motor to a second member of the gear set, provided an engine torque request is absent and the engine is on;
   (c) disengaging the first and second clutches to disconnect the engine and motor from the gear set, provided the engine is off, and using a traction motor to produce wheel torque by driveably connecting the traction motor to driven vehicle wheels, bypassing the gear set.

2. The method of claim 1, wherein step (a) further comprises the first member being a carrier.

3. The method of claim 2, wherein step (b) further comprises the second member being a sun gear.

4. The method of claim 1, wherein step (b) further comprises the second member being a sun gear.

5. The method of claim 1 including step (d) disengaging the first and second clutches to disengage the engine and motor from the gear set and engaging third and fourth clutches to driveably connect the engine to the motor.

6. The method of claim 1, wherein steps (a) and (b) further comprise driveably connecting a third member of the gear set to driven vehicle wheels.

7. The method of claim 6, wherein steps (a) and (b) further comprise driveably connecting a ring gear of the gear set to driven vehicle wheels.

8. A method for controlling a powersplit transmission, comprising:
   (a) transmitting engine power to a first member of a planetary gear set of the transmission by engaging a first clutch, provided an engine torque request is present;
   (b) connecting motor power to a second member of the gear set by engaging a second clutch, provided an engine torque request is absent and the engine is on;
   (c) disengaging the clutches, disconnecting the engine from the gear set, provided the engine is off, and using a traction motor to produce wheel torque by driveably connecting the traction motor to driven vehicle wheels bypassing the gear set.

9. The method of claim 8, wherein step (a) further comprises closing a drive connection between the engine and a carrier of the gear set.

10. The method of claim 8, wherein step (b) further comprises transmitting motor power to a sun gear of the gear set.

* * * * *